United States Patent
Tsai et al.

(10) Patent No.: US 7,333,832 B2
(45) Date of Patent: Feb. 19, 2008

(54) CELLULAR PHONE CAPABLE OF MEASURING TEMPERATURE BY IR MEANS

(75) Inventors: Tony Tsai, Taipei Hsien (TW); David Ho, Taipei Hsien (TW); Jing Zhen, Shanghai (CN); Yi-Min Zhu, Shanghai (CN)

(73) Assignee: Inventec Appliances Corporation, Taipei Hsien (TW)

( * ) Notice: Subject to any disclaimer, the term of this patent is extended or adjusted under 35 U.S.C. 154(b) by 637 days.

(21) Appl. No.: 10/859,230

(22) Filed: Jun. 3, 2004

(65) Prior Publication Data

US 2005/0272468 A1    Dec. 8, 2005

(51) Int. Cl.
*H04M 1/00*    (2006.01)
(52) U.S. Cl. ............... 455/556.1; 455/550.1; 455/556.2; 455/90.1
(58) Field of Classification Search ............. 455/556.1, 455/550.1, 556.2, 90.1
See application file for complete search history.

(56) References Cited

U.S. PATENT DOCUMENTS

| | | | | |
|---|---|---|---|---|
| 4,370,070 A | * | 1/1983 | Leroux | ....................... 374/170 |
| 5,603,101 A | * | 2/1997 | Choi | ......................... 455/566 |
| 6,072,396 A | * | 6/2000 | Gaukel | .................... 340/573.4 |
| 6,166,657 A | * | 12/2000 | Mann | ......................... 340/905 |
| 6,181,103 B1 | * | 1/2001 | Chen | ......................... 320/106 |
| 6,697,645 B1 | * | 2/2004 | MacFarlane | ................ 455/566 |
| 6,754,504 B1 | * | 6/2004 | Reed | ......................... 455/517 |
| 6,788,928 B2 | * | 9/2004 | Kohinata et al. | ........... 455/411 |
| 6,973,301 B1 | * | 12/2005 | Contino et al. | ............ 455/419 |
| 7,027,834 B2 | * | 4/2006 | Soini et al. | .............. 455/556.1 |
| 2002/0068602 A1 | * | 6/2002 | Kuriyama et al. | .......... 455/550 |

* cited by examiner

*Primary Examiner*—Lana Le
*Assistant Examiner*—Ping Y Hsieh
(74) *Attorney, Agent, or Firm*—Bacon & Thomas, PLLC

(57) ABSTRACT

The present invention is to provide a cellular phone capable of measuring temperature including a liquid crystal display, a CPU and an IR temperature measurement means coupled to the CPU, wherein a first GPO pin and a second GPO pin of the CPU are adapted to control power supply of a power supply IC and start or stop of the IR temperature measurement means respectively, and in response to receiving a temperature measurement signal, the CPU performs a plurality of processing and conversion steps to show a corresponding temperature on the display.

3 Claims, 4 Drawing Sheets

CELLULAR PHONE CAPABLE OF MEASURING TEMPERATURE BY IR MEANS

FIELD OF THE INVENTION

The present invention relates to cellular phones, and more particularly to a cellular phone capable of measuring temperature by an IR (infrared) means, including a liquid crystal display, a CPU and IR temperature measurement means coupled to the CPU, for performing not only the functions of communication but also the functions of a temperature measurement gun.

BACKGROUND OF THE INVENTION

The world we are living in has entered into a new era with information technology and electronics being progressed rapidly. All kinds of information products and peripherals are invented due to the fast progress in computer science and technology. The fast development of such new products brings much convenience to our daily life. In response to various kinds of consumer electronic products being developed, most users become more critical with respect to the features and/or quality thereof.

The demand for IR temperature measurement guns and non-contact type IR thermometers has increased steadily before 2003. Further, the demand for such electronic products has risen significantly since the outbreak of SARS (severe acute respiratory syndrome) in 2003.

Conventionally, most electronic products of the type available on the market have a single feature with disadvantages of being high in the manufacturing cost and not easy to carry. Moreover, people may feel inconvenience by carrying a temperature measurement gun for measuring temperature anyplace anytime.

Thus, it is desirable to incorporate an IR means in a cellular phone to form a novel cellular phone so as to meet the large demand for such electronic products on the market and thus increase the market share. In other words, the novel cellular phone not only can operate as a typical cellular phone but also can operate as a typical temperature measurement gun. As such, there is no need of carrying an additional temperature measurement gun simply for the purpose of temperature measurement. As an end, the above problem is solved. Moreover, such novel product definitely can contribute much to the sale of cellular phones produced by a cellular phone manufacturer. In addition, the novel product is beneficial to the vast consumer. In view of above, the development and availability of the multifunctional cellular phone are very important to the cellular phone manufacturers.

Typically, people like to carry a cellular phone. Thus, it is convenient for a person to make or receive a call anywhere anytime. It is envisaged that a minimum modification of hardware and software of a cellular phone can embody the novel cellular phone with a minimum increase of the manufacturing cost. Such not only decreases the financial burden borne on the consumer but also increases the sale of cellular phones.

It is understood that the sale growth of temperature measurement guns is closely related to the outbreak of SARS. But this does not mean that such electronic products are short-term products. To the contrary, in one aspect SARS has awakened people about the importance of health products. Thus, the market of such electronic products is still good in terms of long period of time.

SUMMARY OF THE INVENTION

A primary object of the present invention is to provide a cellular phone capable of measuring temperature as a typical IR temperature measurement gun in addition to making or receiving a call. The present invention can bring a great convenience to users since people like to carry a cellular phone anywhere. The present invention further provide a cellular phone capable of measuring temperature including a liquid crystal display, a CPU, IR temperature measurement means including a plurality of pins each coupled to a corresponding one of a plurality of pins of the CPU, a power supply IC for supplying power to the IR temperature measurement means, and an IR sensor wherein a first GPO pin and a second GPO pin of the CPU are adapted to control power supply of the power supply IC and start or stop of the IR temperature measurement means respectively, and in response to receiving a temperature measurement signal, the CPU performs a plurality of processing and conversion steps to show a corresponding temperature on the display. By utilizing the present invention, the above drawbacks of the prior art can be overcome. These drawbacks are that most prior IR temperature measurement guns and non-contact type IR thermometers available on the market have a single feature with disadvantages of being high in the manufacturing cost and not easy to carry.

The above and other objects, features and advantages of the present invention will become apparent from the following detailed description taken with the accompanying drawings.

DETAILED DESCRIPTION OF THE PREFERRED EMBODIMENTS

The invention is directed to a cellular phone capable of measuring temperature by an IR (infrared) means. Currently, there is a type of much compact IR temperature measurement device available on the market as a result of the fast progress of semiconductor based sensor technology. The IR temperature measurement device comprises an IR sensing probe and a specially designed signal processing circuit. Thus, the IR temperature measurement device has advantages of being simple in use, inexpensive, and high in reliability and accuracy.

Figure 1:
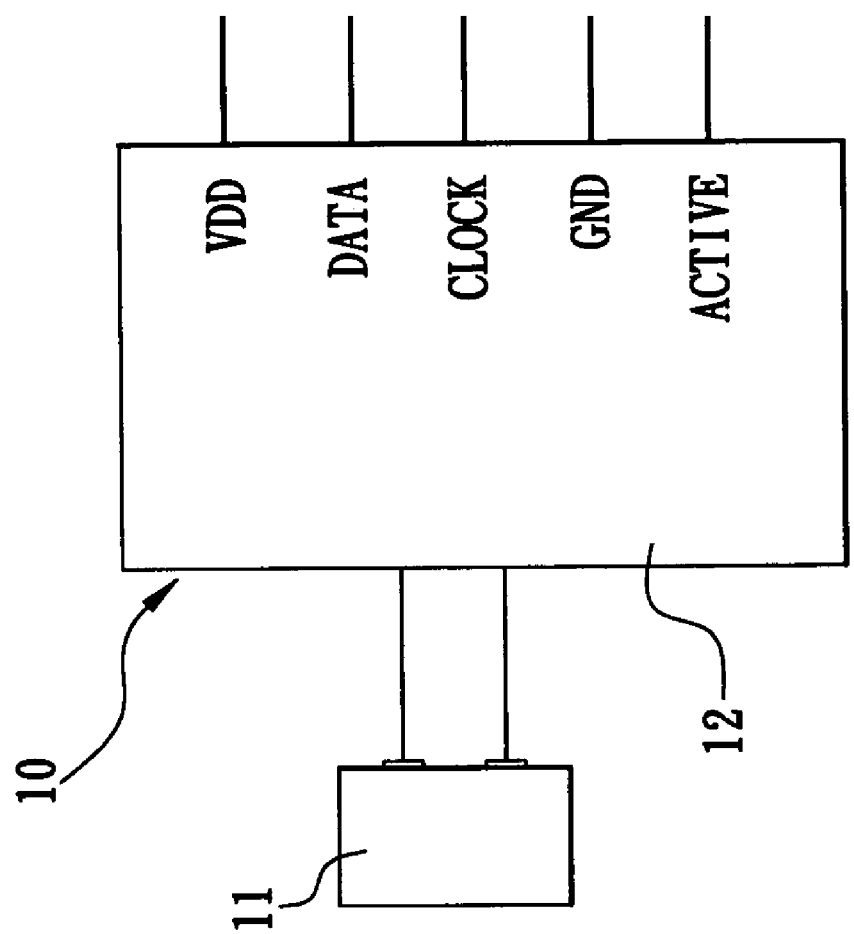
FIG. 1 is a schematic block diagram of a conventional IR temperature measurement device.

In view of above, it is possible of incorporating the IR temperature measurement device in a cellular phone. As shown in FIG. 1, a commercially available IR temperature measurement device 10 comprises an IR sensor 11 and an ASIC (application specific integrated circuit) 12. The ASIC 12 is adapted to amplify, correct, compensate, and perform an A/D (analog-to-digital) conversion with respect to analog data obtained by the IR sensor 11. Such processed data is sent to an I2C (inter-integrated circuit) of a bus prior to output.

As shown in FIG. 1, the ASIC 12 comprises five pins, namely, a power (VDD) pin operative in the range from 2.5V to 3.6V, an I2C data (DATA) pin, an I2C clock (CLOCK) pin, a ground (GND) pin, and an active (ACTIVE) pin. When the ACTIVE pin receives a low level signal, the IR temperature measurement device 10 begins to measure temperature. To the contrary, when the ACTIVE pin receives a high level signal, the IR temperature measurement device 10 stops the measurement.

A CPU (central processing unit) of cellular phone has at least one I2C in its bus. Thus, the IR temperature measurement device 10 can be easily incorporated into the circuitry of cellular phone.

Figure 2:
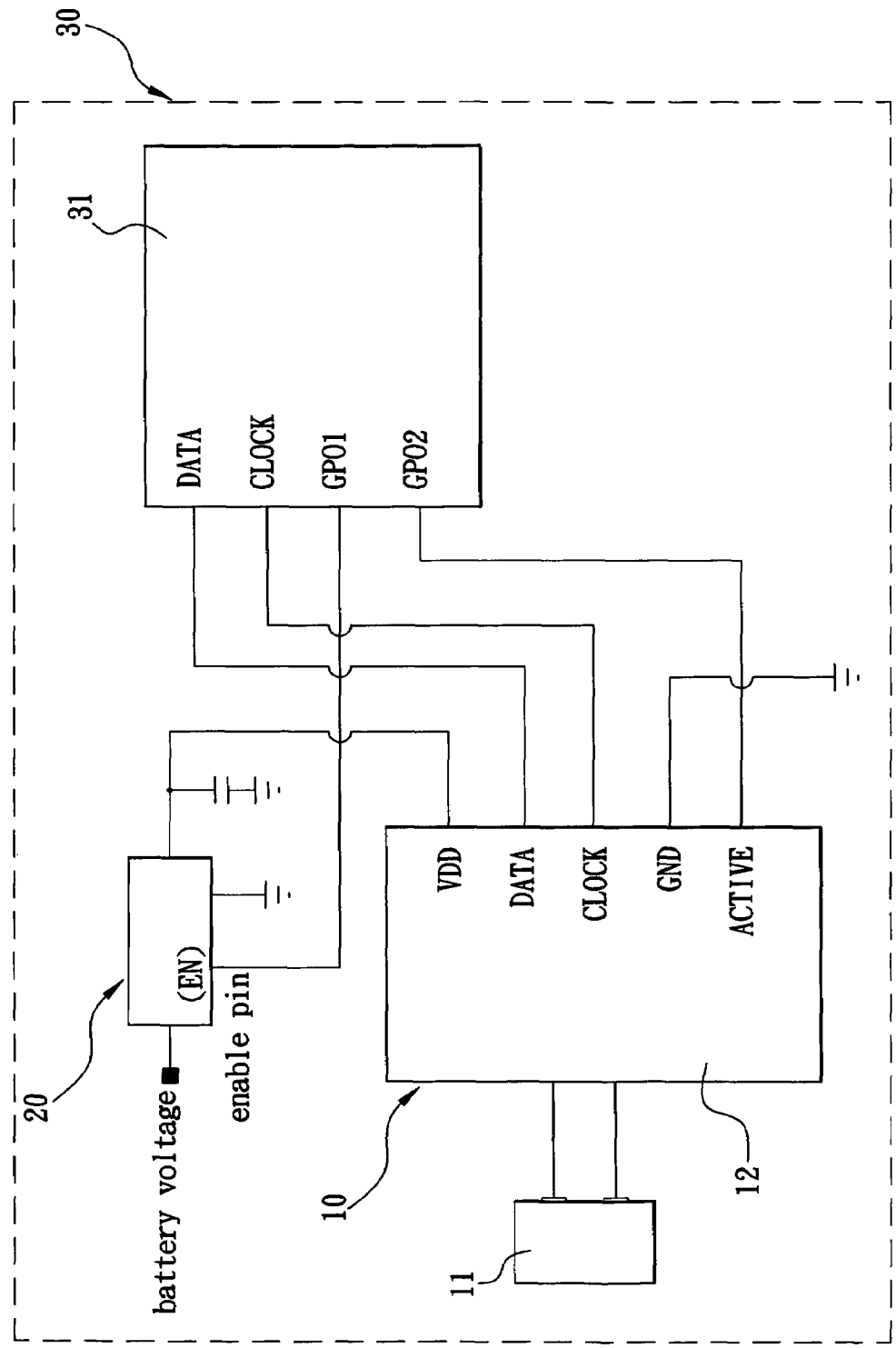
FIG. 2 is a schematic block diagram of a cellular phone incorporating the IR temperature measurement device in FIG. 1 thereinto to form a cellular phone of the invention.

Referring to FIG. 2, there is shown a preferred embodiment of cellular phone 30 having the IR temperature measurement device 10 incorporated into its circuitry. As shown, a power supply IC (integrated circuit) 20 is adapted to supply power to the IR temperature measurement device 10. The I2C DATA pin and the I2C CLOCK pin of the IR temperature measurement device 10 are coupled to an I2C DATA pin and an I2C CLOCK pin of a CPU 31 of the cellular phone 30 respectively. At the same time, a GPO1 (general purpose output) pin and a GPO2 pin of the CPU 31 are adapted to control the power supply of the power supply IC 20 and the start or stop of the IR temperature measurement device 10 respectively.

In FIG. 2, the GPO1 pin of the CPU 31 is coupled to an enable (EN) pin of the power supply IC 20 so that the power supply IC 20 can be enabled again as commanded by an instruction received from the CPU 31 via the EN pin once an interrupt is removed. In an unused state (i.e., no temperature measurement), power supply to the IR temperature measurement device 10 is cut so as to prolong the operating time of the battery in the cellular phone 30.

Moreover, the GPO2 pin of the CPU 31 is coupled to the ACTIVE pin of the IR temperature measurement device 10 for controlling the start or stop of the IR temperature measurement device 10. In an unused state of the IR temperature measurement device 10, the CPU 31 causes both the GPO1 and GPO2 pins to be in a high level. At this time, the power supply IC 20 in FIG. 2 is disabled. That is, no power is supplied to the IR temperature measurement device 10. Also, the VDD pin of the IR temperature measurement device 10 in FIG. 2 is 0V.

Figure 3:
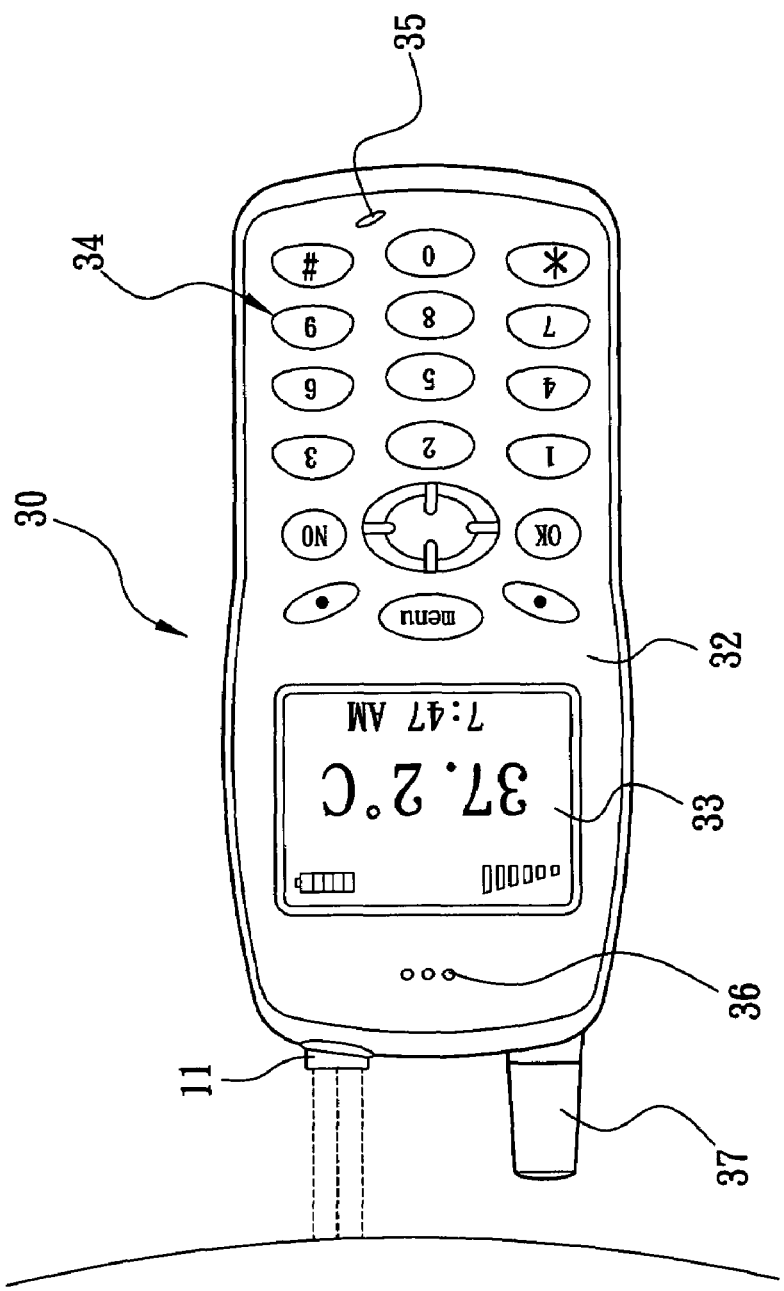
FIG. 3 is a top view of the cellular phone in FIG. 2.

Referring to FIG. 3, there is shown a top view of the cellular phone 30 incorporating the IR temperature measurement device 10 thereinto. As shown, the cellular phone 30 has the same appearance as a typical one. The cellular phone 30 comprises a phone body 32 including a display 33 for showing data or the like, a keypad 34, a microphone 35, a speaker 36, and an antenna 37. The IR sensor 11 is formed at one end of the cellular phone 30 spaced from the antenna 37. The cellular phone 30 is implemented as a hinge type cellular phone in the embodiment shown in FIG. 3, while it is appreciated by those skilled in the art that the hinge type cellular phone may be replaced by another type of cellular phone (e.g., a hinge-less type cellular phone (not shown)) in any other embodiments without departing from the scope and spirit of the invention.

In such a manner, a user may select a "temperature measurement" option of "menu" on the cellular phone 30 for causing the IR sensor 11 to measure temperature. Also, the CPU 31 causes the GPO1 pin to be at a low level. At this time, the power supply IC 20 in FIG. 2 begins to supply power to the IR temperature measurement device 10. The power supply IC 20 will supply a constant power after a predetermined period of time (e.g., in the order of several microseconds). And in turn the GPO2 pin is at a low level. At this time, the IR temperature measurement device 10 begins to send the measured temperature data to the CPU 31 via the I2C thereof. The sent temperature data is required to comply with the specifications of the I2C bus. At the same time, detailed temperature data formats can be referred to the specifications of respective IR temperature measurement devices 10 produced by the manufacturers. Note that different IR temperature measurement devices 10 may have different data formats.

Figure 4:
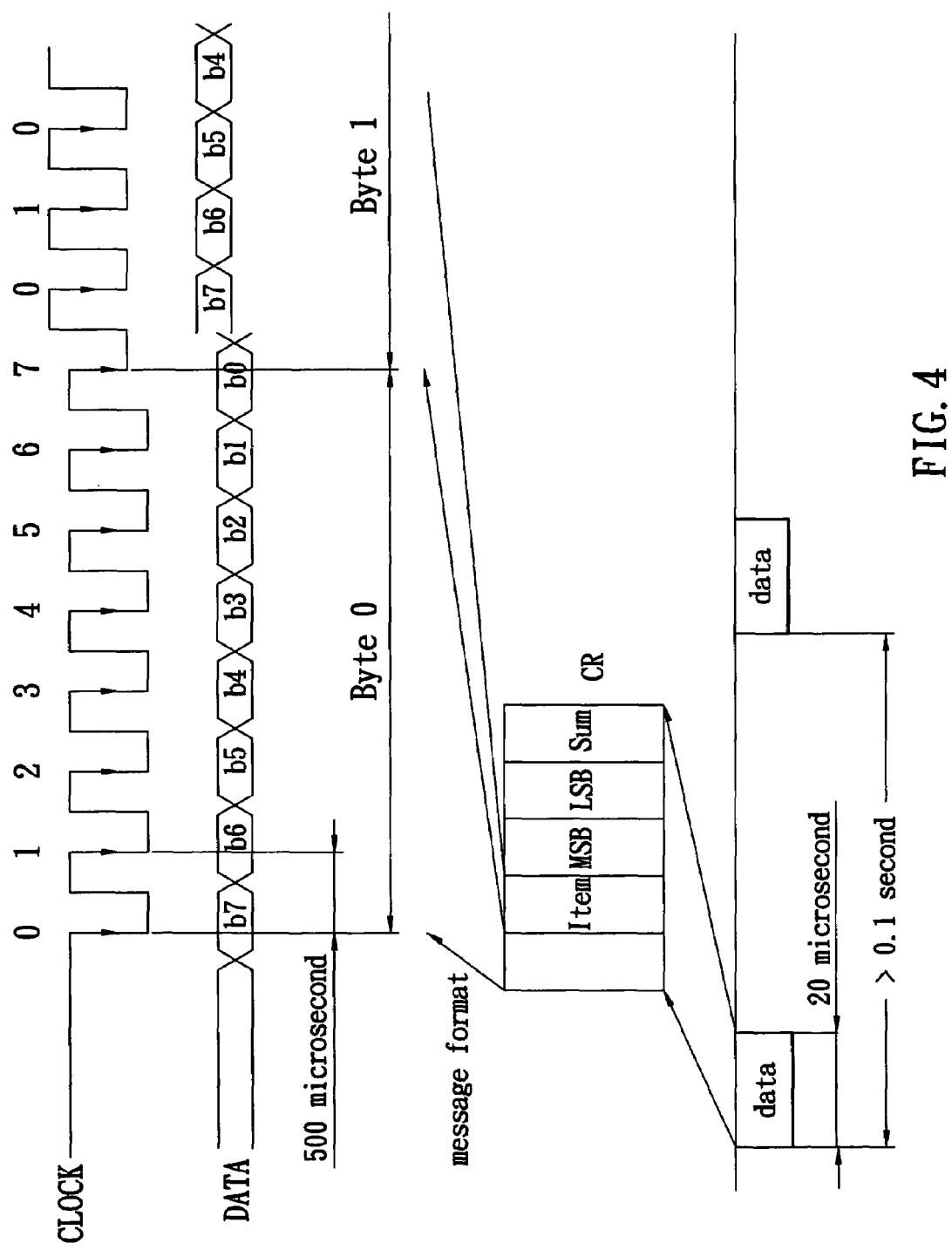
FIG. 4 depicts an exemplary data format according to the invention.

Referring to FIG. 4, there is shown an exemplary data format according to the invention. As shown, there are provided data formats of a CLOCK pin, a DATA pin, and a message format to be sent. The message format comprises an Item (item), a MSB (most significant bit), a LSB (least significant bit), a SUM (sum), and a CR (carriage return). In a case of the ACTIVE pin being at a low level, the CPU 31 receives temperature data measured by the IR temperature measurement device 10. Each record of data is 40 bit long in which Item is 8 bit long for representing data to be sent including ambient temperature, target temperature, system parameters, etc. Specific codes in the Item may be varied depending on the IR temperature measurement devices 10. Following are a 8 bit high, a 8 bit low, a 8 bit checksum, and a 8 bit data end. The binary temperature data is converted into a corresponding Celsius or Fahrenheit degree prior to showing on the display 33 of the cellular phone 30.

Time taken for finishing the above procedure is substantially less than 1 second. Further, temperature update can be done in about 1 to 2 times per second. Hence, it is convenient in use. The precision of the temperature measurement depends on the type of the IR temperature measurement device 10 being used. Generally, after considering the cost factor, a precision in the range of 0.2° C. to 0.5° C. is sufficient for temperature measurement.

While the invention has been described by means of specific embodiments, numerous modifications and variations could be made thereto by those skilled in the art without departing from the scope and spirit of the invention set forth in the claims.

What is claimed is:

1. A cellular phone capable of measuring temperature including:
   a power supply IC for supplying power,
   a CPU including a plurality of pins, wherein a first GPO pin of the CPU is coupled to an enable pin of the power supply IC,
   an IR temperature measurement means including a plurality of pins each coupled to a corresponding one of the pins of the CPU and a power supply pin for receiving power from the power supply IC, wherein a data pin and a clock pin of the IR temperature measuring means are coupled to a data pin and a clock pin of the CPU respectively, such that in an unused state with no temperature being measured, power supply from the power supply IC to the IR temperature measurement means is cut, and an active pin of the IR temperature measurement means is coupled to a second GPO pin of the CPU for controlling the start or the stop of the IR temperature means, and
   an IR sensor coupled to the IR temperature measurement means for sensing temperature,
   wherein in response to receiving a temperature measurement signal from the IR temperature measurement means, the CPU enables the first GPO pin to be at a low level so that the power supply IC is able to supply power to the IR temperature measurement means; and enables the second GPO pin to be at a low level after a predetermined period of time has lapsed so that the IR temperature measurement means is able to send mea sured temperature data to the CPU via the data pins thereof.

2. The cellular phone of claim 1, wherein the IR temperature measurement means comprises an ASIC for amplifying, correcting, compensating, and performing an A/D conversion with respect to analog data obtained by the IR sensor, and the processed data is sent to a data pin of a bus prior to output.

3. The cellular phone of claim 2, wherein the cellular phone further comprises a phone body including a display for showing data, a keypad, a microphone, a speaker, and an antenna, and the IR sensor is formed at one end of the cellular phone.

* * * * *